(12) United States Patent
Carpio et al.

(10) Patent No.: US 8,121,615 B2
(45) Date of Patent: Feb. 21, 2012

(54) MOBILE STATION, WIRELESS COMMUNICATION SYSTEM AND METHOD OF OPERATION

(75) Inventors: Raul E. Carpio, Hampshire (GB); Mark Edwards, Berkshire (GB); Christopher W. Wright, Hampshire (GB); Valerie Wright, legal representative, Hampshire (GB); Anneke Kate Brenner, legal representative, Zürich (CH); Georgina Beth Redican, legal representative, Bad Lippsringe (DE); Klaus Pai, Hohenstein (DE); Matthias Nerling, Berlin (DE)

(73) Assignee: Motorola Solutions, Inc., Schaumburg (IL)

( * ) Notice: Subject to any disclaimer, the term of this patent is extended or adjusted under 35 U.S.C. 154(b) by 0 days.

(21) Appl. No.: 12/515,477

(22) PCT Filed: Oct. 29, 2007

(86) PCT No.: PCT/US2007/082806
§ 371 (c)(1),
(2), (4) Date: Sep. 8, 2010

(87) PCT Pub. No.: WO2008/063823
PCT Pub. Date: May 29, 2008

(65) Prior Publication Data
US 2011/0053605 A1 Mar. 3, 2011

(30) Foreign Application Priority Data
Nov. 15, 2006 (GB) .................................. 0622774.8

(51) Int. Cl.
*H04W 64/00* (2009.01)

(52) U.S. Cl. .................. 455/456.1; 455/456.6; 709/204; 340/666; 370/261

(58) Field of Classification Search ............... 455/456.1, 455/456.6; 340/666, 531; 370/261; 709/204
See application file for complete search history.

(56) References Cited

U.S. PATENT DOCUMENTS

| | | |
|---|---|---|
| 2001/0055975 A1 | 12/2001 | McDonnell |
| 2002/0169539 A1 | 11/2002 | Menard |
| 2004/0087273 A1 | 5/2004 | Perttila |
| 2005/0153730 A1 | 7/2005 | Turetzky |

(Continued)

FOREIGN PATENT DOCUMENTS

| | | |
|---|---|---|
| EP | 1243941 A1 | 9/2002 |
| WO | WO2005114970 A2 | 12/2005 |
| WO | WO2006038071 A | 4/2006 |

(Continued)

OTHER PUBLICATIONS

PCT Search Report Dated Apr. 2, 2008.

(Continued)

*Primary Examiner* — Phuoc Doan
(74) *Attorney, Agent, or Firm* — Terri Hughes Smith; Anthony P. Curtis; Daniel R. Bestor

(57) ABSTRACT

A mobile station (105, 200) operable in a wireless communication system (100), the mobile station including means (218, 202 of 105) for reporting to a location server (104) of the system a current location of the mobile station and a controller (201 of 105) for controlling the means for reporting to report to the location server a current location of a second mobile station (107) detected to be near to the mobile station. A wireless communication system (100) in which the mobile station is operable and a method (500) operable in the system are also described.

20 Claims, 6 Drawing Sheets

U.S. PATENT DOCUMENTS

2006/0052096 A1    3/2006   Dolgov
2006/0079244 A1*   4/2006   Posner et al. ............... 455/456.1
2006/0094443 A1*   5/2006   Dowling et al. ........... 455/456.1

OTHER PUBLICATIONS

GB Search Report Dated Feb. 28, 2007.
GB Amendment Dated Oct. 24, 2008.

* cited by examiner

MOBILE STATION, WIRELESS COMMUNICATION SYSTEM AND METHOD OF OPERATION

CROSS REFERENCE TO RELATED APPLICATIONS

This application is a National Stage filing under 35 USC §371 of co-pending Patent Cooperation Treaty international application having Serial No. PCT/US07/82806 (the "PCT international application") filed on Oct. 29, 2007. This application claims priority to the PCT international application and to prior Great Britain (GB) national application having Serial No. 0622774.8 filed on Nov. 22, 2006, the priority of which was also claimed in the PCT international application. Both the PCT international application and the GB national application are assigned to Motorola, Inc.

FIELD OF THE INVENTION

The present invention relates to a mobile station, a wireless communication system and a method of operation. In particular, the invention relates to reporting of location data by mobile stations in a wireless communication system.

BACKGROUND OF THE INVENTION

It is well known for mobile stations operating in a wireless communication system to monitor their location. An estimate of the current location of each mobile station may be obtained by use in the mobile station of a dedicated location receiver. Such a receiver may detect radio signals from satellites in a known orbit and thereby compute an estimation of the mobile station's current location. A well known example of such a receiver is a GPS receiver. Alternatively, the mobile station may receive signals from at least three fixed transmitters of known position such as transmitters of base stations of a cellular system. The distances from the respective transmitters to the mobile station can be estimated from the times of arrival of the signals from the transmitters. The current location may then be estimated by triangulation.

It is also well known for mobile stations to send to a designated location server within the system regular report messages each giving data describing the current location of the mobile station. The location of all mobile stations within the system may thereby be tracked. Data describing the current location of the mobile stations may be used in known data processing applications running in the system or externally to the system. For example, where the system is a cellular communication system operated by an emergency force such as the police, fire service or ambulance service, location data centrally available at or from a location server from mobile stations operated by users who are personnel belonging to the force allows efficient deployment of such personnel in emergency situations.

Normally, where a mobile station sends location data reports it is usual for the mobile station to send such reports with a fixed periodicity. In connection with the present invention, it has been recognised that in some situations regular periodic reporting of location data to a designated location server by every mobile station in the system may have disadvantages. For example, where mobile stations are located close together, there may be unnecessary use of system wireless resources to send essentially the same location data. Also, an operator using the system to monitor and manage deployment of personnel may have unnecessary work in monitoring mobile stations being used by personnel located close together. Furthermore, in some mobile stations there may also be unnecessary consumption of electrical energy in the usual periodic transmission of regular location data reports, thereby causing an undesirable drain on a battery or other electrical energy source powering the mobile station.

BRIEF DESCRIPTION OF THE DRAWINGS

The accompanying drawings, in which like reference numerals refer to identical or functionally similar elements throughout the separate views and which together with the detailed description below are incorporated in and form part of the patent specification, serve to further illustrate various embodiments and to explain various principles and advantages of the present invention.

In the accompanying drawings.

Figure 1:
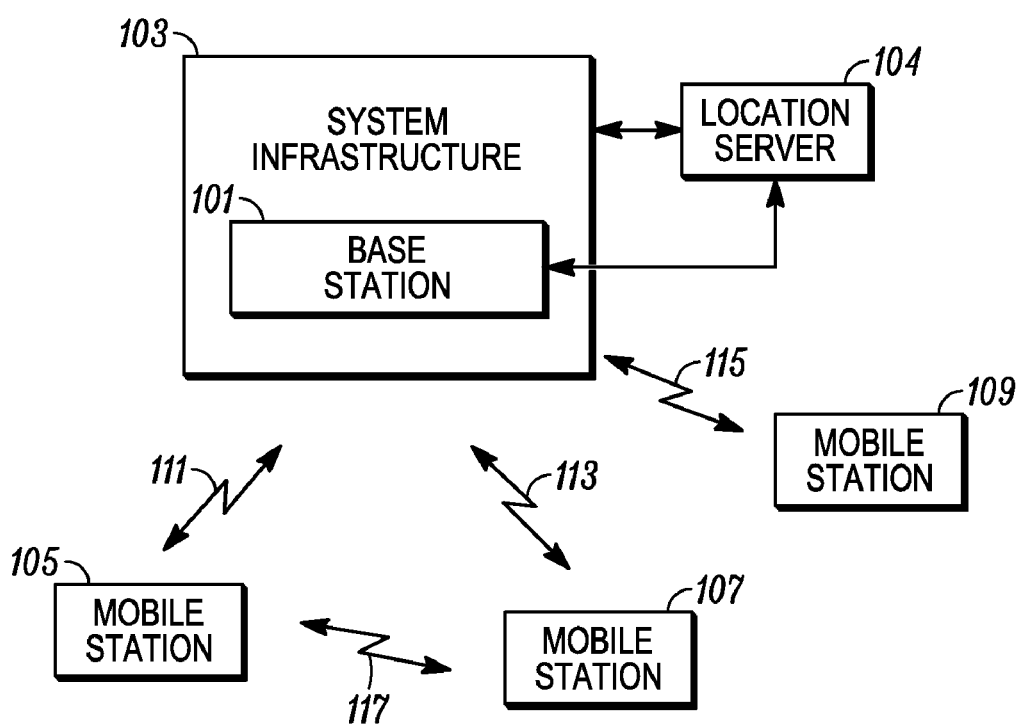
FIG. 1 is a block schematic diagram of a wireless communication system which may be adapted in accordance with an embodiment of the invention.

Skilled artisans will appreciate that elements in the drawings are illustrated for simplicity and clarity and have not necessarily been drawn to scale. For example, the dimensions of some of the elements in the figures may be exaggerated relative to other elements to help to improve understanding of embodiments of the present invention.

DESCRIPTION OF EMBODIMENTS OF THE INVENTION

In accordance with embodiments of the present invention to be described there is provided a first mobile station operable in a wireless communication system, the first mobile station including: (i) first means for reporting to a location server of the system a current location of the first mobile station; and (ii) a controller for controlling the first means for reporting to report to the location server a current location of a second mobile station detected to be near to (having a proximity with) the first mobile station.

In accordance with embodiments of the present invention to be described there is also described a wireless communication system including a first mobile station, a second mobile station and a location server, the first mobile station including first means for reporting to the location server a current location of the first mobile station, the second mobile station including second means for reporting to the location server a current location of the second mobile station, the first mobile station also including a proximity detector for indicating a proximity of the first mobile station and the second mobile station and a controller, operable in response to the proximity detector indicating proximity of the first mobile station and the second mobile station, to control the first means for reporting to report to the location server a current location of the second mobile station. The system may for example be a mobile communication network such as a cellular network.

In this specification the term 'mobile station' refers to any wireless communication station or terminal that is mobile within the communication system. The term includes for example user portable radio communication units, e.g. hand-held or user worn units, vehicle carried radio communication units, personal digital assistants (PDAs) and the like. The proximity detector of the first mobile station embodying the invention, or the first mobile station in the system according to embodiments of the invention, may be operable to indicate to the first means for reporting that a range between the first mobile station and the second mobile station is not greater than a maximum range at which the first and second mobile stations are deemed to be near to one another. The proximity detector may also be operable to indicate to the first means for reporting that a range between the first mobile station and the second mobile station exceeds the maximum range, thereby indicating that the first mobile station and second mobile station are not deemed to be near to one another.

The system may include a network infrastructure which includes or is operationally coupled to the location server. The first mobile station and the second mobile station may be operable each to have a wireless communication link with the infrastructure, e.g. via a base station of the infrastructure, allowing sending via the wireless link location report data for delivery to the location server.

The system may include a location reporting controller operable to detect from a signal from the first mobile station that the first and second mobile stations are near to one another and in consequence to provide to the second mobile station a signal causing the second means for reporting to be temporarily disabled. The location reporting controller may also be operable to detect that the first means for reporting is ready to report or is currently reporting to the location server a current location of the second terminal. Alternatively, or in addition, the location reporting controller may be operable to instruct the first means for reporting to report to the location server a current location of the second terminal. The location reporting controller may be included in the network infrastructure, e.g. in or associated with a serving base station of the first and second mobile stations.

Alternatively, the location reporting controller may be included in the first or the second mobile station.

Where the proximity detector is operable to indicate to the first means for reporting that a range between the first mobile station and the second mobile station exceeds a maximum range indicating that the first mobile station and the second mobile station are not deemed to be near to one another, the location reporting controller may be operable in response to enable the second means for reporting so that it may report location data of the second mobile station.

The system embodying the invention may include means for establishing a wired or wireless communication link directly between the first mobile station and the second mobile station. The proximity detector may be operable to detect when the link is established and when the link is broken. The first mobile station may further be operable to receive from the second mobile station via the link data relating to the location of the second mobile station. The second mobile station may further be operable to receive from the first mobile station via the link data relating to the location of the first mobile station.

The means for establishing a link directly between the first mobile station and the second mobile station may employ one of the short range wireless link technologies well known in the art. In one embodiment of the invention, the means for establishing a direct communication link may include transceivers in the first and second mobile stations which are able to communicate using Bluetooth® technology (as defined later). In another embodiment, the means for establishing a direct communication link may include a radio frequency identification tag held on at least one of the first and second mobile stations and, operably coupled to at least the other of the first and second mobile stations, a detector or reader to detect from the radio frequency identification tag a signal indicating an identity of the mobile station on which the identification tag is held.

FIG. 1 shows a communication system 100 which may be adapted in accordance with an embodiment of the invention. It will be apparent to those skilled in the art that the system 100 and its operational components, especially communication terminals which are to be described as operating therein, may take a number of forms well known to those skilled in the art. Thus, the layout of the system 100, and of its operational components, to be described should be regarded as illustrative rather than limiting. The system 100 of FIG. 1 will be described as an illustrative cellular mobile communication system such as a TETRA system, i.e. a system operating in accordance with protocols of the TETRA standard as defined by the European Telecommunications Standards Institute (ETSI). It could alternatively be a system operating in accordance with the APCO Project 25 standard defined by the Association of Public-Safety Communications Officials—International, Inc.

The system 100 shown in FIG. 1 includes a base station 101 included as part of a system infrastructure 103. The base station 101 has radio links with a plurality of user terminals in a service cell or site defined by the position of the base station 101. The user terminals may include mobile stations and may include at least one fixed terminal, e.g. used by a dispatcher or other operator sending and receiving operational control messages. Three of many possible mobile stations operationally associated with the base station 101 are shown, namely mobile stations 105, 107 and 109 having radio links 111, 113 and 115 respectively with the base station 101. The base station 101 thereby serves mobile stations including the mobile stations 105, 107 and 109 with radio communications to and from other mobile stations either served by the base station 101 or by other base stations (not shown) of the system 100 operably linked to the base station 101 or in other systems (not shown) operably linked to the system 100.

The mobile stations of the system 100 may also be able to establish direct wireless links between themselves. These links may be wired and/or wireless links. Where they are wireless links, they may use a protocol associated with that used for communication with the base station 101, e.g. TETRA direct mode links, and/or may use a short range communication protocol. This may for example be the protocol defined by the Bluetooth® standard. This is the open radio standard defined by the Bluetooth Consortium and Promotion Group. This standard is also known by the name IEEE (Institute of Electrical and Electronics Engineers) standard 802.15.1. Alternatively, another wireless link protocol known to those skilled in the art may be used, e.g. RFID communication between an RFID tag and an RFID reader. An illustrative direct radio link 117 is shown between the mobile station 105 and the mobile station 107.

The system infrastructure 103 includes, in addition to the base station 101, known sub-systems (not shown) known to be required for operation and management of the system 100. Such sub-systems may include for example sub-systems providing authentication, routing, mobile station registration, system management and other operational functions within the system 100. The system infrastructure 103 may include also other base stations (not shown) providing cells serving other mobile stations.

The system 100 includes a location server 104. The location server 104 is of known form and operation and comprises a processor and memory which receive and record data relating to the current location of mobile stations in the system 100 and, upon request from data applications running in the system 100 or outside the system 100, provides data it holds relating to location of mobile stations in the system 100. The location server 104 is operably coupled to the infrastructure 103 and the base station 101. The location server 104 may be incorporated in the system infrastructure 103 or in the base station 101.

Figure 2:
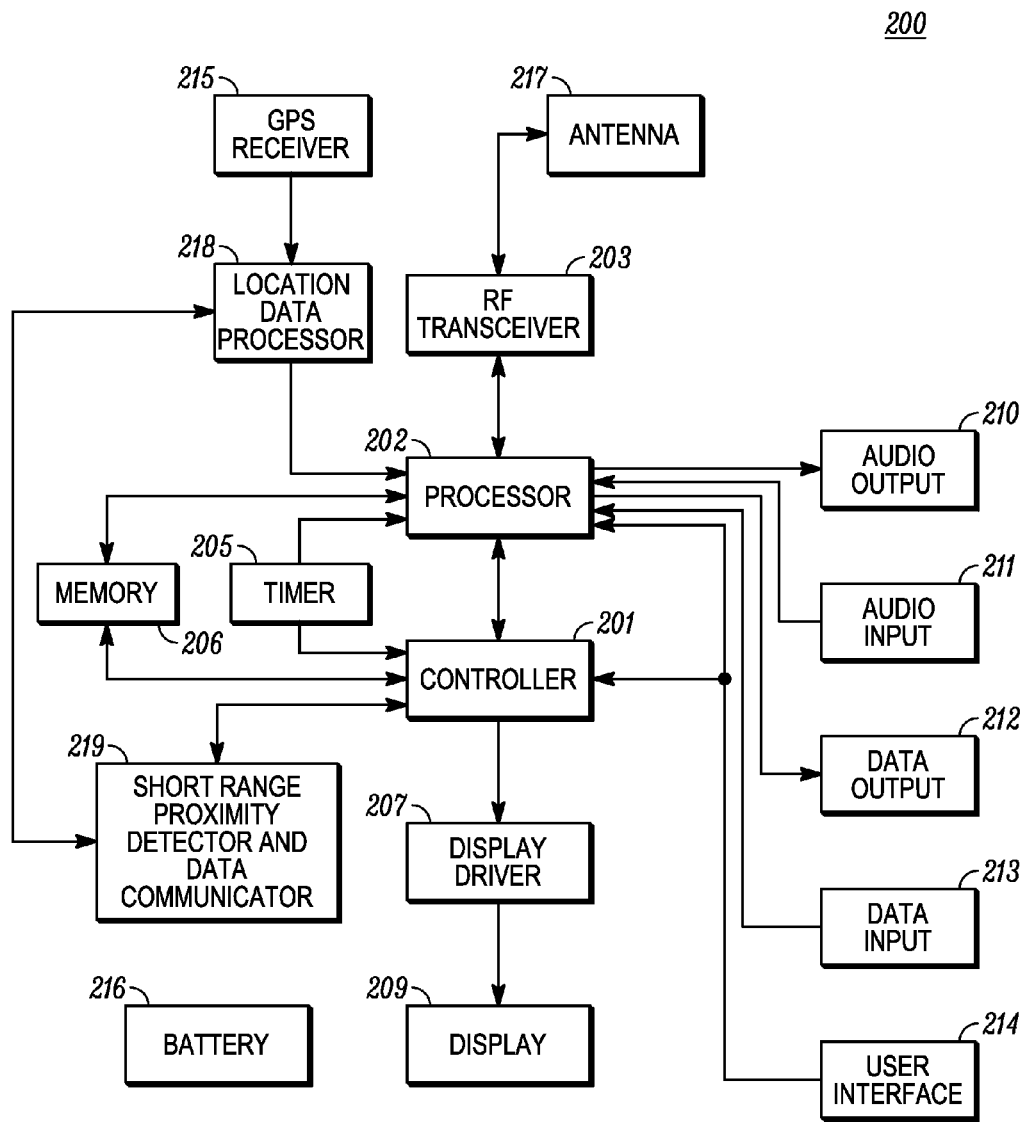
FIG. 2 is a block schematic diagram of a layout of a mobile station in the system of FIG. 1.

FIG. 2 shows a layout 200 of operational components in each mobile station of the system 100, including the mobile stations 105, 107 and 109. As will be apparent to those skilled in the art, the layout 200 of the mobile station may take a number of different forms. The layout 200 should therefore be regarded as illustrative rather than limiting. A controller 201 controls functional operations of the mobile station. A processor 202 operably connected to the controller 201 processes information sent to and from the mobile station. The controller 201 and the processor 202 are operably connected to a timer 205 which provides operational synchronisation and timing and to a memory 206 which stores data and programs needed in operation by the controller 201 and the processor 202.

The processor 202, which may for example comprise a digital processor, which could be included with the controller 201 in a common digital signal processing unit, is operably connected to an RF transceiver 203 which transmits and receives RF signals including signals carrying information sent to and from the mobile station having the layout 200. The signals are delivered over-the-air to and from an antenna 217 connected to the RF transceiver 203.

When the RF transceiver 203 via the antenna 217 receives an RF signal including information representing communicated speech, the processor 202 extracts the speech information and delivers a signal including the extracted speech information to an audio output 210 which comprises a transducer such as a speaker which converts the signal to audio form to reconstruct the communicated speech for a user of the mobile station having the layout 200. The mobile station having the layout 200 also includes an audio input 211 which comprises a transducer such as a microphone which converts speech of the user into the form of an electrical signal and delivers the signal to the processor 202 which processes the signal into a form suitable for inclusion in an RF signal for transmission by the RF transceiver 203 via the antenna 217.

When the RF transceiver 203 receives via the antenna 217 a signal representing communicated (non-speech) data, e.g. alphanumeric characters representing words or numerals or picture, image or video information, the processor 202 extracts information relating to the communicated data and delivers a signal including the extracted data to a data output 212. The data output may for example comprise a connection to an external data processing terminal (not shown), e.g. a personal computer.

A data input 213 provides an input signal from a user including data to be communicated. The data input 213 may for example comprise a connection to a data source, e.g. a personal computer (not shown). The signal provided by the data input 213 is delivered to the processor 202 which processes information included in the signal into a form suitable for inclusion in an RF signal to be transmitted by the RF transceiver 203 via the antenna 217.

The mobile station having the layout 200 includes a user interface 214, e.g. a keypad and control buttons, which allows a user to enter instructions and data into the mobile station. The user interface 214 is operably connected to the controller 201 to receive signals representing instructions entered by a user at the user interface 214. The user interface 214 is also operably connected to the processor 202 to enable a signal representing data entered by the user at the user interface 214 to be delivered to the processor 202. The processor 202 processes data included in the signal into a form suitable for inclusion in an RF signal to be transmitted by the RF transceiver 203 via the antenna 217.

The mobile station having the layout 200 includes a known GPS (Global Positioning System) receiver 215 which receives signals from GPS satellites and computes an estimation of the current location of the mobile station from such signals in a known manner. The GPS receiver 215 is operably connected to a location data processor 218 which carries out processing operations relating to current location data. The location data processor 218 is operably connected to the memory 206 and may record location data in the memory 206. The location data processor 218 is also operably connected to the processor 202 and may deliver current location data to the processor 202. Periodically, the processor 202, using location data from the location data processor 218, prepares a message for reporting such location information. The periodic message is included in an RF signal produced by the RF transceiver 203, and the signal is sent over-the-air from the antenna 217 to the base station 101. The base station 101 retrieves the location report message sent periodically by each mobile station and delivers it to the location server 104 for recording by the location server 104.

The mobile station having the layout 200 may include a display 209 operable to display information to a user in a known manner. The display 209 may be driven by a display driver 207 under control of the controller 201.

A short range proximity detector and data communicator 219 which is described in more detail later is operably connected to the controller 201.

A battery 216 (or other known source) provides a source of electrical energy for all active components of the mobile station. Where the mobile station is a hand portable radio communication unit, the battery 216 may be included in the unit. Where the mobile station is fitted in and carried by a mobile vehicle, the battery 216 may be a battery of the electrical system of the vehicle.

Figure 3:
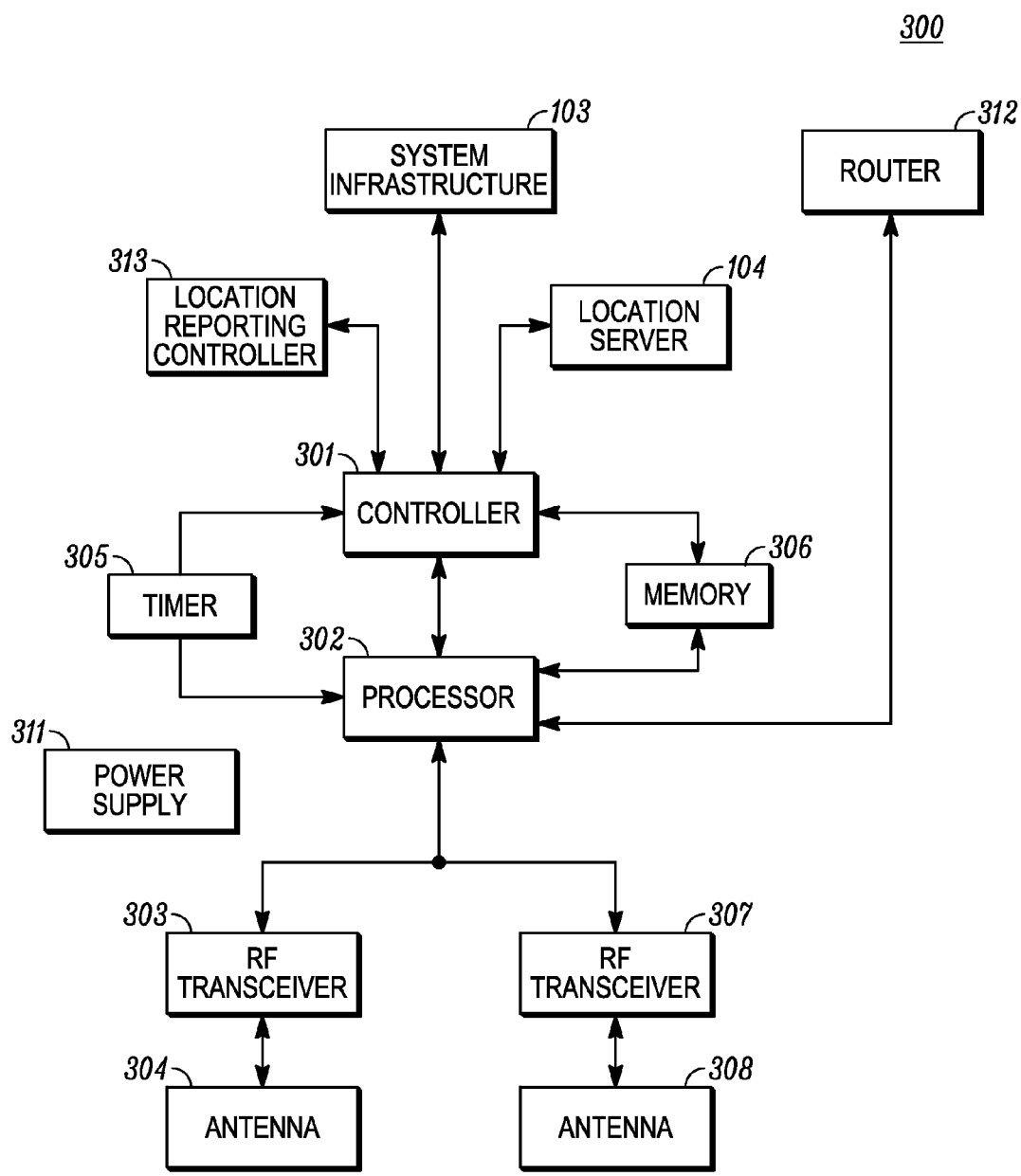
FIG. 3 is a block schematic diagram of a layout of a base station in the system of FIG. 1.

FIG. 3 shows a layout 300 of operational components in the base station 101. A similar layout may be used in any other base stations (not shown) of the system 100. As noted earlier, and as will be apparent to those skilled in the art, the layout of the base station 101 may take a number of different forms. The layout 300 should therefore be regarded as illustrative rather than limiting. In the layout 300, the controller 301 controls functional operations of the base station 101. Such operations include allocation of resources of communications to and from mobile stations served by the base station 101. A processor 302, e.g. a digital processor, operably connected to the controller 301, which could be included with the controller 301 in a common digital signal processing unit, processes information sent in RF signals to and from the base station 101. The controller 301 and the processor 302 are operably connected to a timer 305 which provides operational synchronisation and timing and to a memory 306 which stores data and programs needed in operation by the controller 301 and the processor 302.

The processor 302 is operably connected to a plurality of RF transceivers two of which are shown, namely an RF transceiver 303 and an RF transceiver 307. Each of the RF transceivers 303 and 307 transmits and receives RF signals including signals carrying information sent to and from user terminals including mobile stations served by the base station 101. The signals are delivered over-the-air to and from an antenna 304 connected to the RF transceiver 303 and to and from an antenna 308 connected to the RF transceiver 307.

When the RF transceiver 303 receives via the antenna 304 an RF signal including information representing communicated speech or data, the signal is passed to the processor 302. Similarly, when the RF transceiver 307 receives via the antenna 308 an RF signal including information representing communicated speech or data, the signal is passed to the processor 302. The processor 302 converts each signal including communicated information from the transceiver 303 or the transceiver 304 into an electronic signal including communicated information. The communicated information includes system control information and user communicated information for onward delivery. Where the communicated information comprises system control information the electronic signal produced by the processor 302 is passed to the controller 301.

Where the electronic signal produced by the processor 302 comprises user communicated information for onward delivery it is delivered to a router 312 which routes the electronic signal toward its destination, e.g. via the system infrastructure 103. Similarly, each incoming electronic signal received from outside the base station which includes communicated user information, i.e. to be sent to one of the user terminals including mobile stations served by the base station 101, is routed by the router 312 to the processor 302. The processor 302 processes the electronic signal into a form suitable for inclusion in an RF signal for transmission by the transceiver 303 via the antenna 304 or for transmission by the transceiver 307 via the antenna 308.

The processor 302 also prepares and receives system control messages received from the controller 301.

The controller 301 is operably connected to the location server 104 and thereby delivers to the location server 104 location data received periodically from mobile stations served by the base station 101. The location data may also be stored in the memory 306. A location reporting controller 313 is operably connected to the controller 301. The location reporting controller 313 may be operably connected to or even incorporated in the location server 104 (FIG. 1). The location reporting controller 313 controls, through the controller 301, reporting by mobile stations served by the base station 101 of data relating the location of such mobile stations. Such controlling may be carried out in a manner described later.

The layout 300 of the base station 101 includes a power supply 311, e.g. from the main (mains) electricity supply, which provides a source of electrical energy for all active components of the base station 101.

Figure 4:
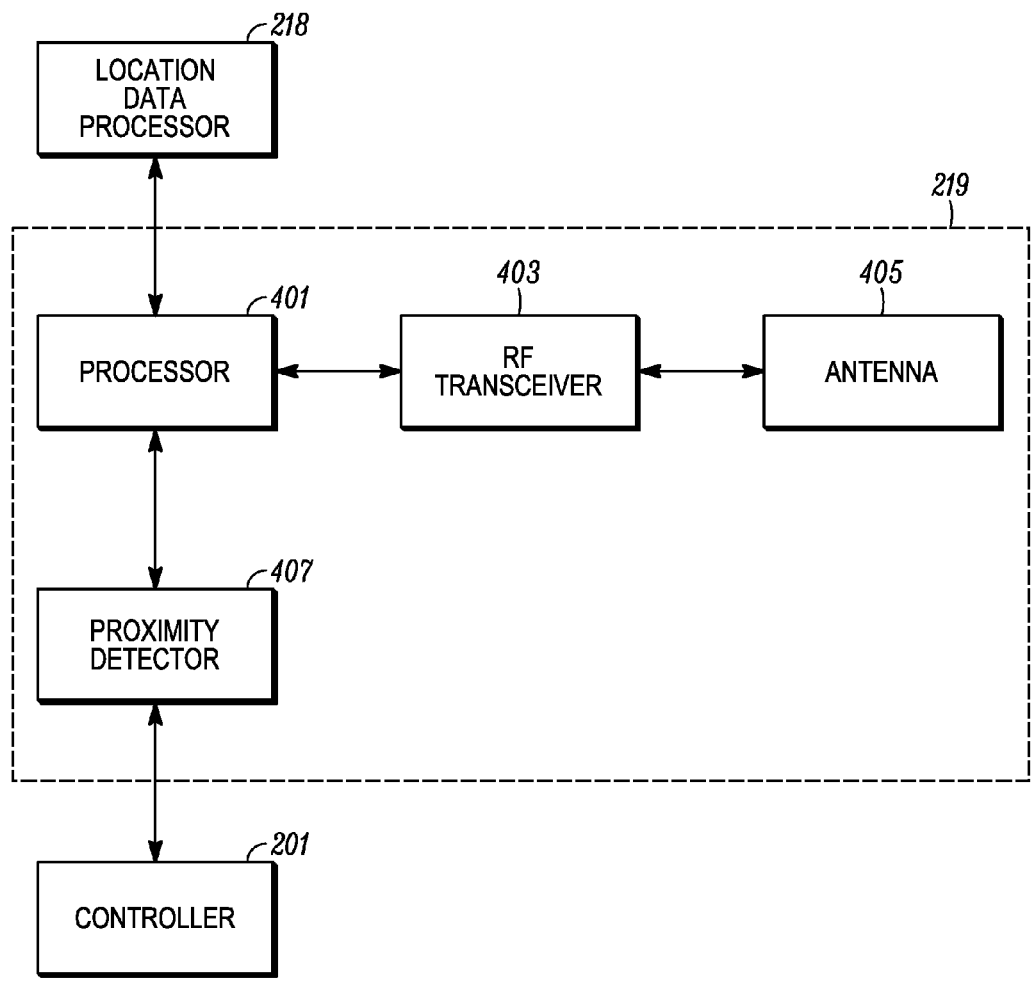
FIG. 4 is a block schematic diagram showing more detail of part of the mobile station layout of FIG. 2.

FIG. 4 shows part of the mobile station layout 200 shown in FIG. 2 including more detail of an example of the short range proximity detector and data communicator 219, herein referred to as the 'communicator 219'. The communicator 219 of a given mobile station in this example includes a processor 401 which generates a data message to be sent to a similar communicator 219 in one or more other mobile stations. The processor 401 is operably connected to an RF transceiver 403 which forms a short range RF signal including the data message, e.g. using the protocol of the Bluetooth® standard referred to earlier or using another short range wireless communication protocol as will be apparent to those skilled in the art. The signal is transmitted as a wireless signal by the antenna 405. The signal is received at any other mobile station within range by the antenna 405 and RF transceiver 403 of such other mobile station(s) and is passed to the processor 407 of such other mobile station(s).

The communicator 219 may be used in a first mode or in a combination of the first mode and a second mode. In the first mode, which is a proximity detection mode, the communicator 219 may issue an enquiry wireless signal to indicate its presence and to request a response from any mobile station receiving the enquiry signal. If the signal is received by at least one other mobile station, the other mobile station may send a return wireless signal to acknowledge that it has received the enquiry signal. The return signal when received by the communicator 219 is passed by the processor 401 to a proximity detector 407. The proximity detector 407 thereby detects that the mobile station sending the acknowledgement signal is within short range of the mobile station sending the enquiry signal. For example, the mobile station 105 may have sent the enquiry signal and the mobile station 107 may have sent the return signal. The short range may be a known maximum range for signals to be sent and received between the communicators 219 of different mobile stations. For communicators 219 operating according to the Bluetooth® protocol, the maximum range may for example be in the range 10 to 100 meters, depending on the power of the transmitted signal. Where the proximity detector 407 detects that another mobile station comes into range or goes out of range, the detector 407 may issue an indication signal to the controller 201 accordingly. The indication signal may include an identity of the other mobile station which may have been included in the return signal from the other mobile station.

In a second mode of the communicator 219, data may be exchanged with the communicator 219 of another nearby mobile station. In particular, the data exchanged may comprise location related data held by one of two communicating mobile stations and needed by the other mobile station. For example, the mobile station 107 may cease to receive location data via its GPS receiver 215, e.g. because the mobile station 107 has entered a building or a tunnel, and may therefore send an enquiry to other nearby mobile stations to find out which can provide useful location data. Nearby mobile stations may respond with a signal indicating what location data they can provide. Such mobile stations may indicate a factor describing a type and/or quality of the location data they can provide. Where several mobile stations respond, the mobile station 107 may select the responding mobile station which can provide the best type and/or quality of location data. Where only one mobile station responds, the mobile station 107 may arrange to receive location data from that other mobile station. For, example the mobile station 105 may respond to the enquiry signal from the mobile station 107 indicating that it can provide location data gathered by its own GPS receiver 215 and location data processor 218. The processor 401 of the communicator 219 of the mobile station 107 then receives such location data and passes it to the location data processor 218 of the mobile station 107.

Although the location data received in this way does not describe the precise location of the mobile station 107, the location data processor 218 of the mobile station 107 is aware that the data describes an approximate location of the mobile station 107 since the mobile stations 105 and 107 are known to be in close proximity owing to the short range communications possible via the respective communicators 219.

The communicator 219 may be further employed in accordance with an embodiment of the invention in the following way. Where two mobile stations are detected to be in close range of one another, as determined by the proximity detector 407 of one of the mobile stations, one mobile station may take over the task of the other mobile station of reporting location data to the location server 104. For example, the mobile station 105 may be a vehicle carried radio communication unit and the mobile station 107 may be a user portable radio communication unit. The proximity detector 407 of the mobile station 105 may detect that the mobile station 107 is within close range of the mobile station 105. The controller 201 of the mobile station 105 or of the mobile station 107 may then issue a signal causing the mobile station 105 to take over reporting of location data of the mobile station 107 for as long as the mobile station 107 is detected to be in range of the mobile station 105.

In another example of the communicator 219, the proximity detector 407 may comprise a sensor which detects that the mobile station 107 has been placed in a receptacle operably connected to the mobile station 105, e.g. by wiring or cabling. For example, the receptacle may comprise a cradle in a vehicle in which the mobile station 105 is fitted. The mobile station 107 may be a hand portable unit and the cradle may be adapted in a known manner to receive the mobile station 107 in a hands free mode. The cradle may include a switch, triggered by the mobile station 105 being placed in or removed from the cradle, acting as the sensor in a known manner. Such a cradle may be connected by wiring or cabling to the mobile station 105 and communication between the mobile station 105 and the mobile station 107, e.g. to provide location data, and/or to provide control information, may be via the wiring or cabling.

A wireless link rather than a wired link between the mobile station 105 and the mobile station 107 is usually preferred, e.g. because it is more convenient for users of a portable mobile station such as the mobile station 107 to keep the mobile station attached to their clothing rather than release it to place it in a receptacle.

Figure 5:
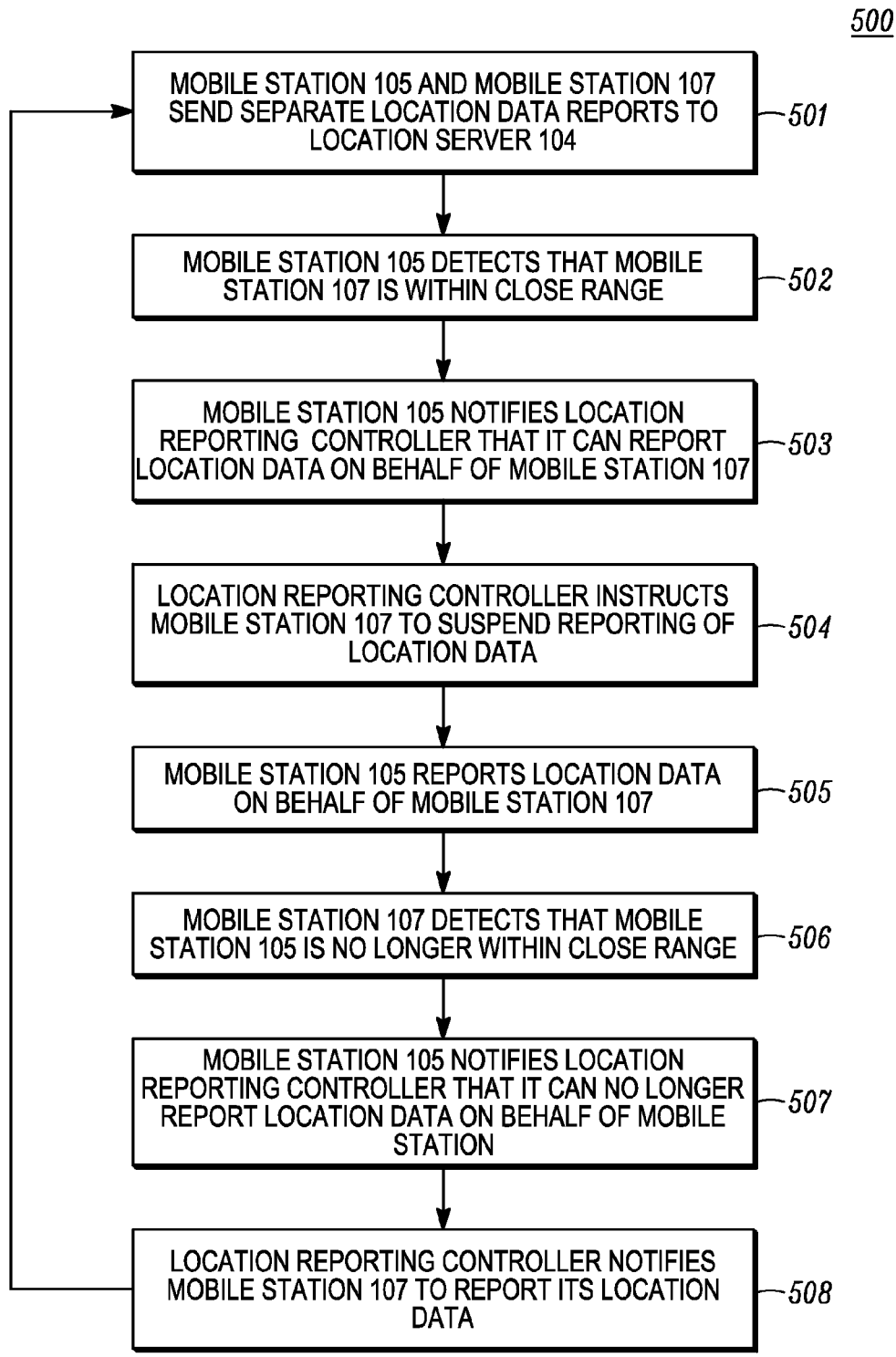
FIG. 5 is a flow chart of a method of operation embodying the invention in the system of FIG. 1.

FIG. 5 is a flow chart of an illustrative method 500 embodying the invention. The method 500 concerns reporting to the location server 104 via the base station 101 of data relating to the current location of the mobile station 105 and relating to the current location of the mobile station 107. In an initial step 501, the mobile station 105 and the mobile station 107 are separately reporting location data to the location server 104. In a step 502 the mobile station 105 detects, e.g. by its proximity detector 407, that the mobile station 107 is within close range of the mobile station 107. In a step 503, the mobile station 105 notifies a location reporting controller that it can report to the location server 104 data relating to the location of the mobile station 107 as well as relating to its own location. The location reporting controller may be the location reporting controller 313 (FIG. 3) of the base station 101. Alternatively, the location reporting controller may comprise a function of the mobile station 107, e.g. of its controller 201, or of the mobile station 105, e.g. of its controller 201.

The mobile station 105 may be a mobile station of a kind which is designated to take over reporting of location data of the mobile station 107, which may be a mobile station of another kind, if both the mobile station 105 and the mobile station 107 are detected to be in close proximity. For example, the mobile station 105 may comprise a mobile vehicle carried radio communication unit and the mobile station 107 may comprise a user portable radio communication unit. Alternatively, or in addition, the mobile station 107 may notify the mobile station 105 that it is unable to receive or report location data, e.g. because it is in a building or tunnel.

In a step 504, the location reporting controller instructs the mobile station 107 to suspend reporting of location data to the location server 104. In a step 505, the mobile station 105 reports to the location server 104 location data on behalf of the mobile station 107 as well as on its own behalf. This reporting results from an internal instruction of the controller 201 of the mobile station 105. The controller 201 may issue such an instruction as soon as the mobile station 105 detects that it can report location data on behalf of the mobile station 107. Alternatively, the controller 201 of the mobile station 105 may wait for an instruction signal from the location reporting controller 313 before it provides an internal instruction signal.

Location data describing the respective locations of the mobile station 107 and the mobile station 105 may be sent in step 505 by the mobile station 105 in a common message or in separate messages in an RF signal to the base station 101 and is delivered by the base station 101 to the location server 104. The message giving the location data of the mobile station 107 may include an indication that the location is obtained by detection of proximity of the mobile station 107 to the mobile station 105 rather than directly by the mobile station 107, e.g. through its own GPS receiver 215.

Eventually, in a step 506, the mobile station 105 detects that the mobile station 107 is no longer within close range of the mobile station 105. In a step 507, the mobile station 105 notifies the location reporting controller that it can no longer report location data on behalf of the mobile station 107, e.g. because the proximity detector 407 of the mobile station 105 detects that the mobile stations 105 and 107 are no longer near to one another. In response, in a step 508, the location reporting controller instructs the mobile station 107 to report its own location data to the location server 104. The method 500 thereby returns to step 501.

Figure 6:
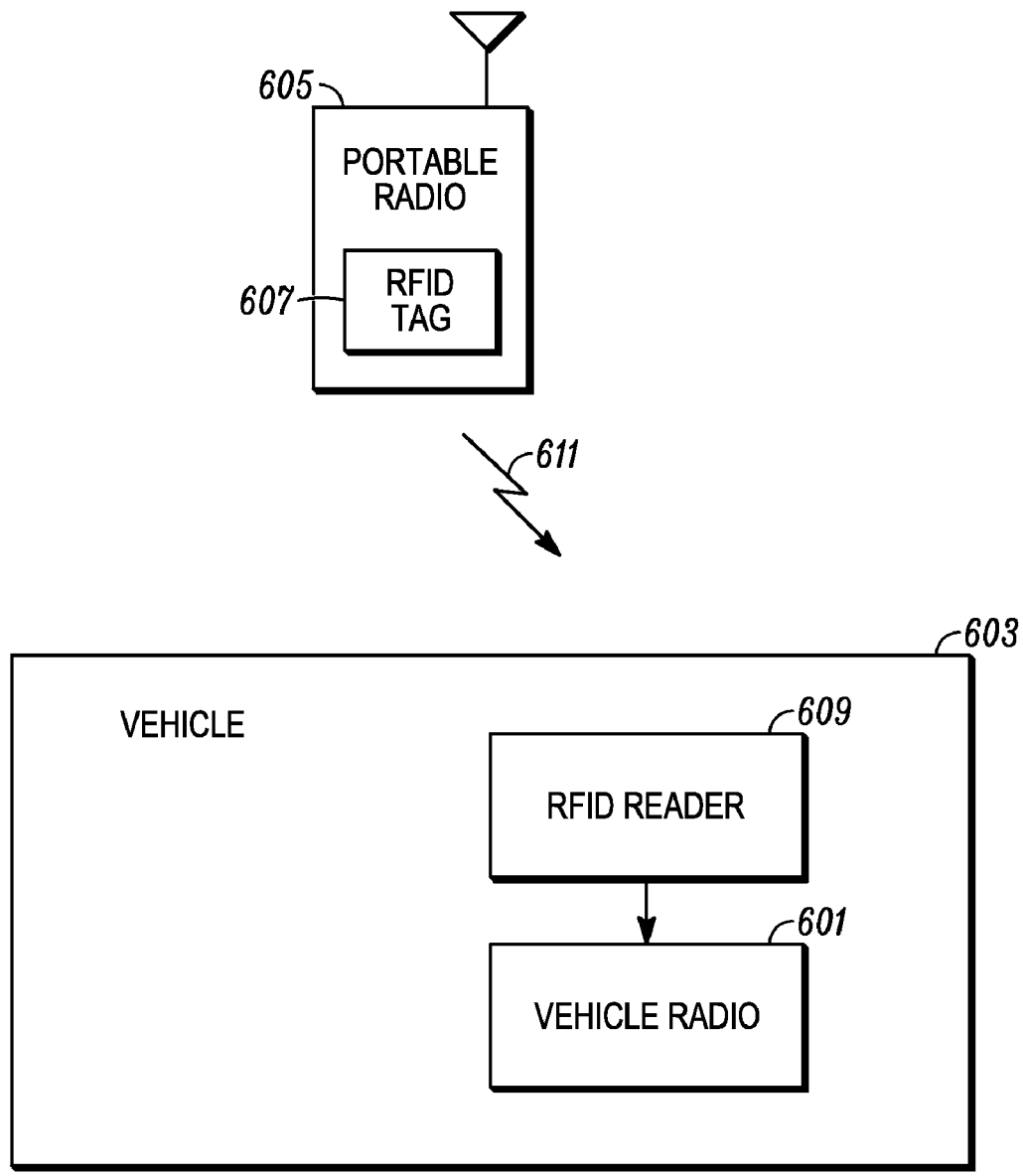
FIG. 6 is a block schematic diagram of an arrangement of communication units in an alternative embodiment of the invention.

FIG. 6 is a block schematic diagram showing an alternative arrangement 600, embodying the invention, of mobile stations in the system 100. In the arrangement 600, there is a vehicle radio (communication unit) 601 fitted in and carried by a mobile vehicle 603. There is also a user portable radio (communication unit) 605 carrying a RFID (radio frequency identification) tag 607. An RFID reader 609 is fitted in and carried by the vehicle 603. The RFID reader 609 is operably connected to the vehicle radio 601. A radio link 611 provides radio communication between the RFID tag 607 and the RFID reader 609.

In the arrangement 600, detection of the proximity of the portable radio 605 to the vehicle radio 601 is carried out by the RF identification reader 609 detecting an RF signal from the RFID tag 607. The RFID reader 609 may also detect an identity of the portable radio 605 from the signal, e.g. the ISSI (Individual Short Subscriber Identity) or the ITSI (Individual TETRA Subscriber Identity) of the portable radio 605 where the portable radio 605 operates in a TETRA system. A procedure similar to that used in the method 500 may then follow in which the vehicle radio 601 takes over reporting of location data of the portable radio 605 to a location server of the system 100, e.g. the location server 104.

In a modification of the above embodiments of the invention, one mobile station may detect that a plurality of mobile stations are within close range and may take over reporting of location data to a location server on behalf of each of the plurality of mobile stations for so long as each is detected to be within close range of that one mobile station.

In the embodiments of the invention which have been described, the following benefits are obtained. The wasteful use of system communication resources to provide regular, periodic reports of location data from multiple mobile stations having the same or a similar location is avoided. Where an operator using the communication system has to monitor and manage deployment of personnel using location reports delivered to the location server, the operator's work may be simplified by reducing the number of mobile stations separately sending location reports. Furthermore, unnecessary consumption of electrical energy needed for regular, periodic transmission of the location data reports in some mobile stations, particularly user portable units which are battery powered, can also be avoided. Further possible benefits include: (i) the possibility that a plurality of mobile stations can be observed at the location server (e.g. on a display connected to it) to be operationally associated with one another; and (ii) for the mobile station which is not reporting its own location, the provision of more accurate location data or some rather than no location data describing the location of the mobile station is possible.

In the foregoing specification, specific embodiments of the present invention have been described. However, one of ordinary skill in the art will appreciate that various modifications and changes can be made without departing from the scope of the present invention as set forth in the accompanying below. Accordingly, the specification and drawings are to be regarded in an illustrative rather than a restrictive sense, and all such modifications are intended to be included within the scope of present invention as defined by the accompanying claims.

The invention claimed is:

1. A mobile station, operable in a wireless communication system, whose location is required to be periodically reported to and recorded by a location server of the system, the mobile station comprising:
   a location data processor operable to receive location data indicating a current location of the mobile station;
   means for periodically reporting to the location server, by wireless communication to a base station of the system, location data obtained from the location data processor; and
   a controller for controlling the means for reporting to report to the location server, by wireless communication to the base station, data relating to a current location of a second mobile station, whose location is required to be periodically reported to and recorded by the location server, when detected to be near to the mobile station.

2. A mobile station according to claim 1, wherein the means for reporting is operable, in response to receiving a control signal from the controller, to report to the location server a current location of the second mobile station.

3. A mobile station according to claim 1, wherein the mobile station also includes a proximity detector for detecting that the second mobile station is near to the mobile station and for sending to a location reporting controller a signal indicating a proximity of a second mobile station to the mobile station.

4. A mobile station according to claim 3, wherein the proximity detector is operable to indicate to the controller that a range between the first mobile station and the second mobile station is either (1) not greater than a maximum range at which the first and second mobile stations are deemed to be near to one another, or (2) exceeds the maximum range, thereby indicating that the first and second mobile stations are not deemed to be near to one another.

5. A mobile station according to claim 3, including means for establishing a communication link directly between the mobile station and the second mobile station and wherein the proximity detector is operable to detect when the link is established and when the link is broken.

6. A mobile station system according to claim 5, wherein the mobile station is further operable to receive from the second mobile station via the communication link data relating to the location of the second mobile station.

7. A mobile station according to claim 5, wherein the mobile station is further operable to send to the second mobile station via the communication link data relating to the location of the mobile station.

8. A mobile station according to claim 1, wherein the controller for controlling the means for reporting is operable in response to receiving a signal from a location reporting controller.

9. A mobile station according to claim 8, wherein the location reporting controller is in an infrastructure of the system or in the second mobile station.

10. A mobile station according to claim 1, wherein the controller is operable to control the means for reporting to stop reporting to the location server a current location of a second mobile station when the second mobile station is detected to be no longer near to the mobile station.

11. A wireless communication system comprising:
    a location server operable to receive and record data relating to the location of mobile stations;
    a first mobile station whose location is required to be periodically reported to and recorded by the location server;
    a second mobile station whose location is required to be periodically reported to and recorded by the location server; and
    a controller operable to control reporting of location data to the location server by the first and second mobile stations,
    wherein the first mobile station including a location data processor operable to receive data indicating a current location of the first mobile station, means for reporting to the location server, by periodically sending by wireless communication to a base station, data obtained from the location data processor relating to the current location of the first mobile station and a proximity detector for indicating a proximity of the first mobile station and the second mobile station, and wherein the controller is operable, in response to the proximity detector indicating proximity of the first mobile station and the second mobile station, to control operation of the first mobile station causing the first means for reporting to send periodically to the location server, by wireless communication to the base station, data relating to the current location of the second mobile station and to control the second mobile station to suspend reporting of its location to the location server.

12. A system according to claim 11, wherein the proximity detector is operable to indicate to the first means for reporting that a range between the first mobile station and the second mobile station is either (1) not greater than a maximum range at which the first and second mobile stations are deemed to be near to one another, or (2) exceeds the maximum range, thereby indicating that the first and second mobile stations are not deemed to be near to one another.

13. A system according to claim 11, including a location reporting controller which is operable to detect from a signal from the first mobile station that the first and second mobile stations are near to one another and in consequence is operable to send to the second mobile station a signal causing the second means for reporting to be temporarily disabled.

14. A system according to claim 11, including means for establishing a direct communication wired or wireless link between the first mobile station and the second mobile station.

15. A system according to claim 14, wherein the means for establishing a direct communication link includes a radio frequency identification tag held on at least one of the first and second mobile stations and, operably coupled to at least the other of the first and second mobile stations, a detector to detect from the radio frequency identification tag a signal indicating an identity of the mobile station on which the identification tag is held.

16. A system according to claim 11, wherein at least one of the first and second mobile stations is operable to search for or request wireless signals from transmitters, other than of the first and second mobile stations, providing current location data.

17. A system according to claim 16, including at least one further wireless communication terminal operable in response to receiving a request signal from the first or second mobile station to transmit a signal indicating its capability to provide current location information.

18. A method of operation in a wireless communication system comprising:
  a location server operable to receive and record data relating to the location of mobile stations;
  a first mobile station whose location is required to be periodically reported to and recorded by the location server;
  a second mobile station whose location is required to be periodically reported to and recorded by the location server; and
  a controller operable to control reporting of location data to the location server by the first and second mobile station, the method including a location data processor of the first mobile station receiving GPS data indicating a current location of the first mobile station, the first mobile station periodically reporting its location to the location server by periodically sending, by wireless communication to a base station, location data obtained from the location data processor, a proximity detector indicating a proximity of the first mobile station and the second mobile station, and the controller, in response to the indication of proximity by the proximity detector, controlling operation of the first mobile station by causing the first mobile station to send periodically to the location server, by wireless communication to the base station, data relating to the current location of the second mobile station and controlling the second mobile station to suspend reporting of its location to the location server.

19. A method according to claim 18 wherein the data relating to the location of the first mobile station ate the data relating to the location of the second mobile station are sent by the first mobile station in a common message.

20. A method according to claim 18 wherein a message including the data relating to the location of the second mobile station includes an indication that the location of the second mobile station is obtained by proximity to the first mobile station.

* * * * *

UNITED STATES PATENT AND TRADEMARK OFFICE
CERTIFICATE OF CORRECTION

PATENT NO.         : 8,121,615 B2
APPLICATION NO.    : 12/515477
DATED              : February 21, 2012
INVENTOR(S)        : Carpio et al.

Page 1 of 1

It is certified that error appears in the above-identified patent and that said Letters Patent is hereby corrected as shown below:

On the title page, item (75), under "Inventors", in Column 1, Line 3, after "Wright," insert -- Deceased, --.

In Fig. 6, Sheet 6 of 6, insert -- 600 --, above the figure.

Signed and Sealed this
Eighteenth Day of December, 2012

David J. Kappos
*Director of the United States Patent and Trademark Office*